United States Patent [19]

Hompel et al.

[11] Patent Number: 4,962,986
[45] Date of Patent: Oct. 16, 1990

[54] DEVICE FOR COUPLING LIGHT TO AND FROM A LIGHT GUIDE

[75] Inventors: M. ten Hompel, Dortmund; Christoph Gebauer, Hamm; Roland Scherer, Weinheim, all of Fed. Rep. of Germany

[73] Assignee: Fraunhofer-Gesellschaft zur Forderung Der Angewandten Forschung e.V., Munich, Fed. Rep. of Germany

[21] Appl. No.: 337,275

[22] Filed: Apr. 13, 1989

[30] Foreign Application Priority Data

Apr. 13, 1988 [DE] Fed. Rep. of Germany ....... 3812203

[51] Int. Cl.$^5$ .......................... G02B 6/26; G02B 6/20; H01J 5/16; G02F 1/00
[52] U.S. Cl. ..................... 350/96.15; 350/96.10; 350/96.16; 350/96.29; 350/96.30; 350/96.32; 250/227.11; 250/227.25; 455/612; 455/617
[58] Field of Search ............... 350/96.10, 96.15, 96.16, 350/96.17, 96.19, 96.20, 96.32, 96.29, 96.30, 96.31, 96.33; 250/227.11, 227.25; 455/602, 609, 610, 612, 617, 618, 619, 601

[56] References Cited

U.S. PATENT DOCUMENTS

| 4,060,308 | 11/1977 | Barnoski et al. ............. 350/96.15 X |
| 4,125,768 | 11/1978 | Jackson et al. ...................... 250/227 |
| 4,675,521 | 6/1987 | Sugimoto ............................. 250/227 |
| 4,732,446 | 3/1988 | Gibson et al. ..................... 350/96.15 |
| 4,749,248 | 6/1988 | Aberson, Jr. et al. ............ 350/96.19 |
| 4,749,249 | 6/1988 | Hockaday et al. ................ 350/96.20 |
| 4,863,229 | 9/1989 | Yasui ................................. 350/96.10 |
| 4,887,879 | 12/1989 | Prucnal et al. .................... 350/96.15 |
| 4,889,403 | 12/1989 | Zucker et al. ..................... 350/96.15 |

FOREIGN PATENT DOCUMENTS

| 3110041A1 | 9/1982 | Fed. Rep. of Germany ... 350/96.10 X |
| 208237 | 3/1984 | Fed. Rep. of Germany ... 350/96.15 X |

Primary Examiner—Brian Healy
Attorney, Agent, or Firm—Weingarten, Schurgin, Gagnebin & Hayes

[57] ABSTRACT

A device for variably coupling light to and from a light guide is provided. The device couples light into or out of a light guide while the coupling device is moved relative to a fixed light guide or while a light guide is moved relative to the coupling device. In one embodiment, the present invention comprises moveably contacting with the core of the light guide a conducting solid having an index of refraction greater than the index of refraction of the medium surrounding the light guide. In an alternative embodiment, the present invention comprises sliding the core of the light guide into a chamber filled with a liquid having an index of refraction higher than the index of refraction of the medium surrounding the remainder of the light guide and placing a transducer in the chamber in contact with the fluid. In an application of the invention it provides information transmission path between a data source and a data receiver of the type which may move relative to each other as in the case of controlled industrial mechanisms.

13 Claims, 5 Drawing Sheets

DEVICE FOR COUPLING LIGHT TO AND FROM A LIGHT GUIDE

FIELD OF THE INVENTION

The present invention relates generally to light guides, and more particularly to a device for coupling light to or from a light guide by means of a coupling element and a data transmission path between relatively movable elements.

BACKGROUND OF THE INVENTION

Electronic systems are usually connected for data transmission by copper or other electrical conductors. Light guides, however, are increasingly being used in place of copper conductors for many applications. Because data exchange over light guides takes place using light beam pulses, which carry no electrical charges, data transmission over light guides is not sensitive to electromagnetic noise fields. Moreover, light guides are superior to copper conductors in terms of transmission rate and bandwidth.

A typical light guide, called a step-index fiber, includes a glass fiber enclosed in a jacket layer. Light is coupled out of the light guide by removing the jacket layer at a desired coupling point and by attaching a coupling element to the glass fiber core of the light guide. Although this coupling can take place at any point along the fiber, the coupling is permanent and fixed at that point.

Other methods for coupling light guides also exist. For example, in the field of integrated optical circuits, light guides in the form of glass layers are evaporated onto quartz glass substrates with lower indices of refraction than the glass layers. Prism couplers, which are prism-shaped dielectrics with higher indices of refraction than light guides, can also be used for coupling light into and out of light guides. Coupling by these methods is possible at any point on a light guide, but once the point is selected, the coupling is permanent and fixed at that point.

Because it is often necessary to transmit data to or from moving points; for example, to or from rotating or sliding data banks, machinery or cable drums. These known methods for coupling light guides are permanent and fixed, the known coupling methods cannot be used to transmit data to or from moving points. For that purpose, conventional electrical conductors with slip rings or slip rods are used. These are disadvantageous not only because of a lower bandwidth, but because of noise, electromagnetic interference, cost and bulk exhibited by such systems.

SUMMARY OF THE INVENTION

The present invention is a means for variably coupling light to and from light guides. The present invention therefore can couple light to and from a moving light guide or from a fixed light guide at varying locations along the light guide. The present invention, therefore, makes the positive characteristics of glass fiber technology available for applications which have conventionally used slip-rings or slip-rods for data transmission, and overcomes the disadvantages of such conventional metal slip conductors.

In its broad sense, the present invention comprises using a coupling element, movable along the light propagation direction, to couple light modes between either the jacket of a light guide or its core and a transducer. The portion of the light modes that can be coupled is a function of the index of refraction of the coupling element relative to the index of refraction of the medium surrounding the light guide. The magnitude of the amount of light which can be coupled out of the light guide depends upon the the size of the contact area between the light guide and the coupling element. The coupling principle is the same whether the coupling element couples to a fiber-shaped or a flat shaped light guide.

In the case of the conventional step-index fiber, which has a round glass or plastic core surrounded by a jacket having an index of refraction smaller than the index of refraction of the core, all of the light coupled into the fiber at an angle smaller than the acceptance angle of the fiber is guided by total reflection at the core/jacket interface along the fiber. If the step-index fiber is freed from its jacket layer, the result is a fiber with only one index of refraction. Data transmission, however, is still possible through the step-index fiber freed of its jacket because of total reflection at the glass-/air interface.

The present invention comprises movably contacting the core of the step-index fiber with an optical fluid medium or a light conducting solid having an index of refraction greater than the index of refraction of the medium surrounding the fiber. Light escapes out of the glass fiber core at the point of contact and is received by a sensor that in turn provides a signal which is processed electronically. The step-index fiber can be either completely or partially freed of its jacket layer around the area of contact.

In one embodiment which minimizes transmission losses, the coupling element is in the form of an optical slide which couples light out of a light guide and also functions as a light guide to transmit the coupled light from the light guide to a sensor in a receiver. Coupling between the optical slide and the step-index fiber can be improved by placing a high cohesion fluid in contact between the slide and the glass fiber. This bridging of the air gap between the slide and the fiber minimizes transmission losses. In the case of transmission over long distances, transmission losses can also be compensated by feeding the coupled light through high dynamic laser diodes.

An alternative highly efficient embodiment of the present invention comprises sliding the step-index glass fiber, completely freed of its jacket, through a chamber filled with a fluid having the appropriately high index of refraction. The fluid couples light out of the glass fiber over the entire length of the fiber which contacts the fluid within the chamber and is received by a photodiode within the chamber.

A complete data system from node to node or terminal to terminal is provided according to the invention wherein one node is movable relative to the other. By virtue of the present invention, the advantages of light guide technology are available in slip-ring and slip-rod applications for data transmission. These advantages include insensitivity to powerful electromagnetic fields, no need for the potential adjustment required for copper conductors, small space needs despite high transmission rates, no cross talk between fibers because the fibers do not have fields of their own, no sparking if the fibers break, high bandwidth and transmission speed of the transmission channel, and price advantages over high-priced conventional slip-ring, and slip-conductor transmitters with equally good transmission characteristics. These advantages are a particular advantage over short transmission distances between moving mechanisms of less than ten meters at low financial and technical expense.

DESCRIPTION OF THE DRAWINGS

The invention will be more fully understood from the following detailed description provided in conjunction with the accompanying drawings, in which.

DETAILED DESCRIPTION OF THE PREFERRED EMBODIMENTS

Figure 1:
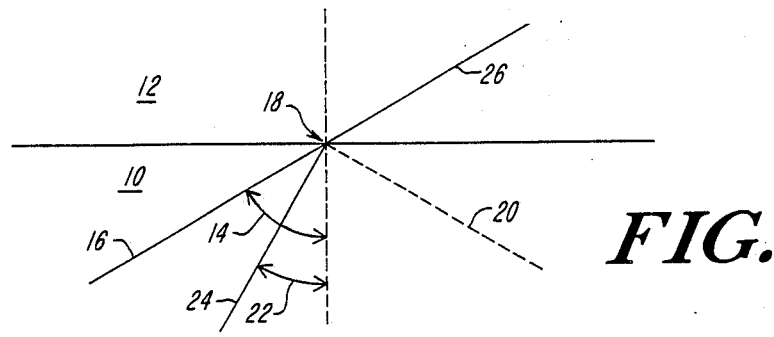
FIG. 1 is a graph showing the reactions of light beams at the interface between two mediums having different indices of refraction.

Referring now to the drawings, wherein like reference numerals designate corresponding or similar elements throughout the several views, in FIG. 1, and by way of technical explanation, the path of a light beam is broken when the light from a medium 10 with a high index of refraction strikes an interface with a medium 12 with a smaller index of refraction. If the angle of incidence 14 of a light beam 16 measured to the normal exceeds the so-called critical angle the phenomenon of total reflection occurs. Apart from scattering and other losses, the light is completely reflected at the interface with medium 18 into reflected beam 20. If the angle of incidence 22 of a light beam 24 is less than the so-called critical angle, light from the medium 10 with the high index of refraction transits the interface providing a partially transmitted beam 26.

Figure 2:
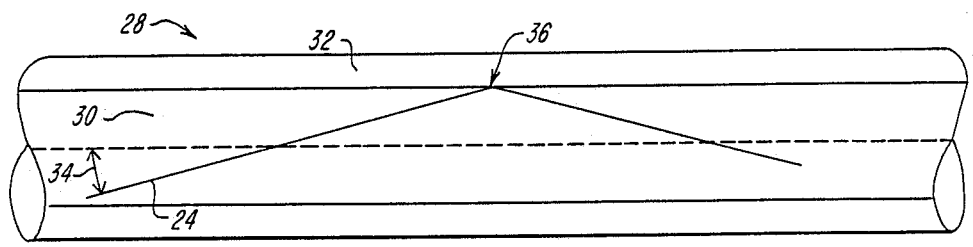
FIG. 2 is a diagram showing how a step index fiber guides a light beam.

FIG. 2 shows the simplest fiber in conventional use, the so-called step-index fiber. In a step-index fiber 28, a round glass or plastic core 30, 50 microns to one millimeter in diameter, is surrounded by a jacket 32 with an index of refraction approximately one percent smaller than the index of refraction of the core 30. All of the light in a beam 24 which is coupled into the fiber at an angle 34 greater than the critical angle is guided along the fiber by total reflection at the core/jacket interface 36. For optical data transmission a light beam in the form of light pulses is coupled into the glass fiber at one end using a laser diode. At the opposite end, the light pulses are detected by a receiver equipped with a photodiode.

If the step-index fiber is freed of its protective jacket, its external optical layer, the result is a fiber with only one index of refraction. Data transmission, however, is still possible nevertheless with some transmission losses.

Figure 3:
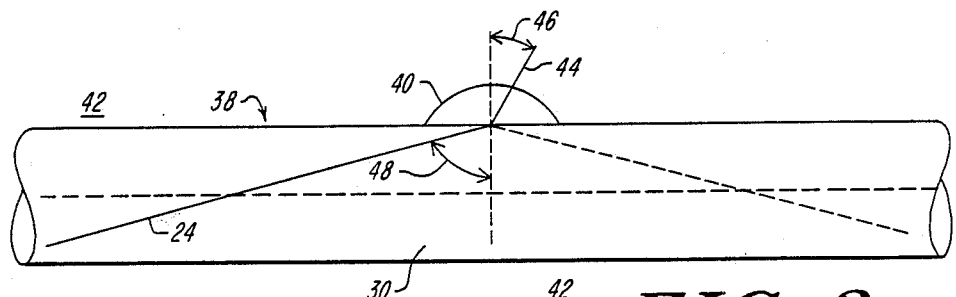
FIG. 3 is a diagram showing how a light beam is coupled out of the core of a glass fiber in accordance with the present invention.

According to the present invention as shown in FIG. 3, if the surface 38 of the glass fiber core 30 is wetted by a transparent liquid 40 with a higher index of refraction than the index of refraction of the medium 42 surrounding the glass fiber core so as to defeat the total internal reflection, the light beam 24 will emerge at the wetted point and leave the optical axis of the fiber at the liquid/glass interface as an output beam 44. This same effect can be accomplished according to the present invention by touching the glass fiber with a solid which is optically conducting, and as isotropic as possible, if the index of refraction of the solid is also greater than the index of refraction of the medium surrounding the glass fiber core. The angle of the emerging light 46 can be calculated using the law of refraction as follows: $a_F = \arcsin(\sin(a_K) * \eta_K/\eta_F)$, wherein: $a_F$ is the angle of the emerging light 46; $a_K$ is the angle 52; $\eta_K$ is the index of refraction of the glass fiber core 30; and $\eta_F$ is the index of refraction of the liquid 40. The light coupled out of the glass fiber in this manner is received by a sensor, its electrical output processed using signal processing technology.

Figure 4:
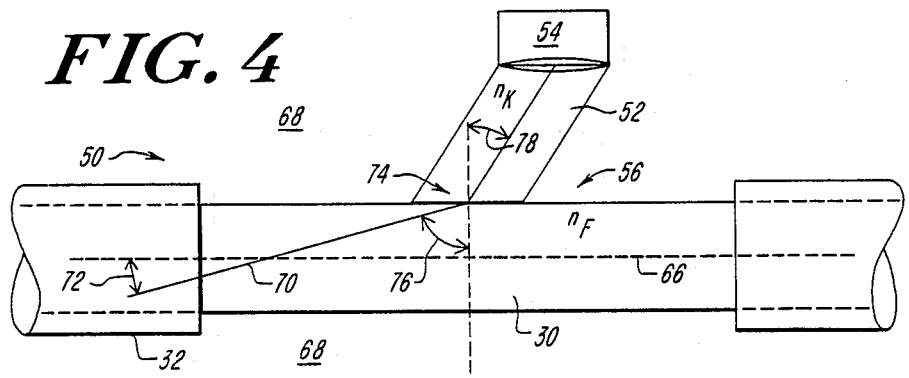
FIG. 4 is a diagram showing one embodiment of the present invention.
Figure 5:
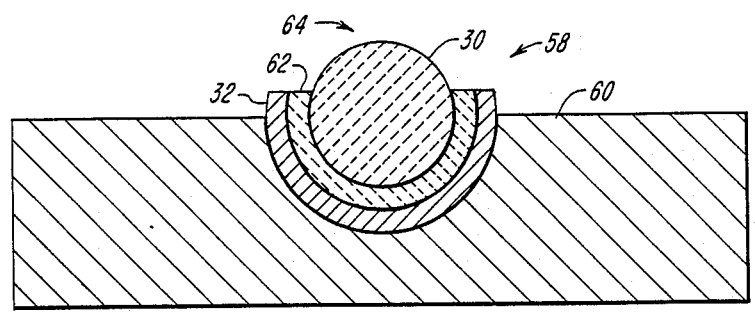
FIG. 5 is a cross-section view cross-wise of a gradient fiber partially freed of its jacket and mounted on a guide track.

The present invention provides, in a manner simple to manufacture, means for coupling light to and from a light guide through a variable coupling point. One embodiment shown in FIG. 4 includes a glass fiber 50, an optical slide 52 and a photodiode 54. The glass fiber 50 is completely or partially freed from its jacket 32 in an area of contact 56 with the optical slide 52. FIG. 4 shows the glass fiber 50, which is a step-index fiber, completely freed of its jacket 32 in the area of contact 56 to expose glass fiber core 30. FIG. 5, however, shows a gradient glass fiber 58 partially freed of its jacket 32 and mounted on a guide track 60. As shown in FIG. 5, the jacket 32 and an intermediate cladding layer 62 having a second index of refraction are removed from a top portion 64 of the gradient glass fiber 58 to expose core 30.

Referring back to FIG. 4, optical slide 52 is movable along the direction of the lengthwise axis 66 of the glass fiber 50 by whatever means are appropriate and contacts the glass fiber core 30. An emersion liquid can be used between the optical slide 52 and the core 30 to improve coupling. The index of refraction of the optical slide 52 is always greater than the index of refraction of the ambient medium 68 around the glass fiber core 30.

A pulsed beam 70 of light is fed into the glass fiber core 30 at an angle 72. The light beam 70 strikes the interface 74 between the glass fiber core 30 and the optical slide 52 at an angle 76. Because of the higher index of refraction of the optical slide 52, the light beam 70 enters the optical slide at an angle 78 and is received by the photodiode 54.

Figure 6:
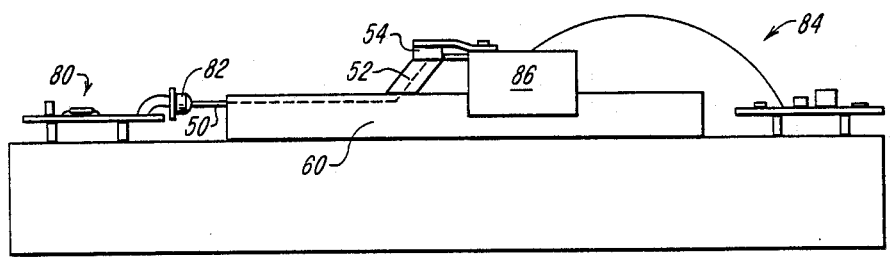
FIG. 6 is a side plan view of an experimental set-up of the present invention.

As can be seen in FIG. 6, an experimental embodiment of the present invention comprises a transmitter 80 having a laser diode 82, a glass fiber 50 mounted on a guide track 60, an optical slide 52 contacting the core of the glass fiber 50 and a receiver 84 including a photodiode 54 and a preamplifier 86.

Figure 7:
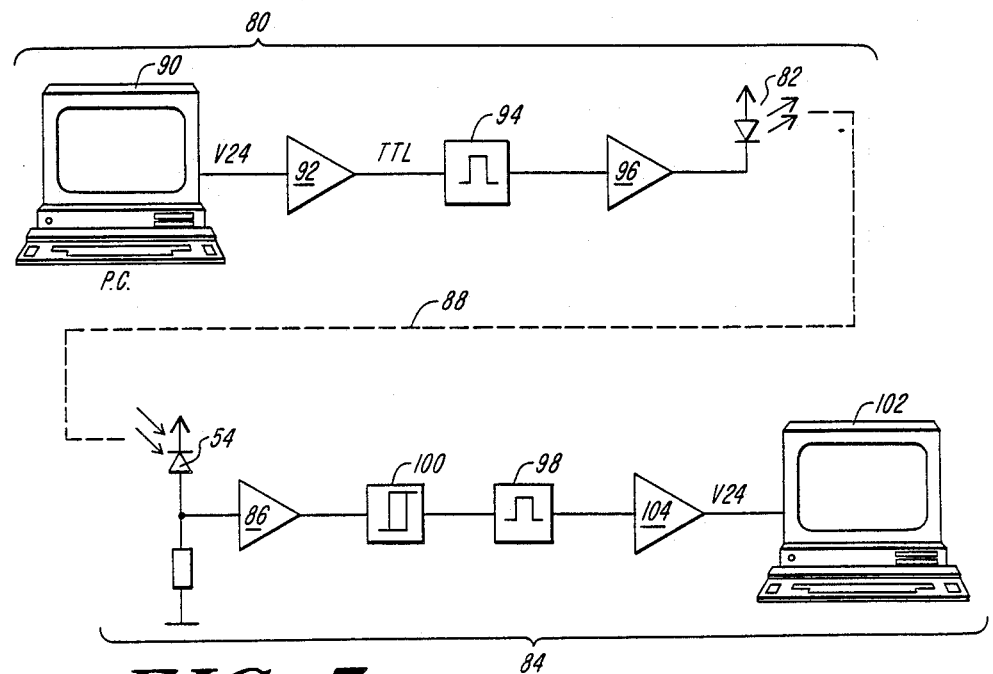
FIG. 7 is a diagram of a node to node signal path using the embodiment of FIG. 6.

FIG. 7 provides an overview of the signal path of the experimental embodiment. Dashed line 88 represents the path of the light beam pulses through the glass fiber 50 and optical slide 52. In the transmitter 80, data is transmitted from a personal computer 90 after conversion from the V24 standard to TTL level by V24 receiver 92. A circuit 94 composed of two one-shots, convert the TTL signals into pulses of 100 nsec duration which are, in turn, amplified by a driver 96 to drive the laser diode 82. In the experimental embodiment, a pulsed laser diode of the LD 74 type, having four watts of power at a scanning ratio of 1;1000, is used to ensure good dynamics for the diode 82. To minimize losses, the laser diode 82 is coupled to the glass fiber using an emersion liquid.

The optical slide 52 of the experimental embodiment is made of polystyrene, which has an index of refraction of 1.59. The index of refraction of the glass fiber 50 is 1.5 and according to the formula discussed above, the angle of the optical slide 52 was calculated to have a value of at least 30° to the optical axis of the glass fiber. The optical slide 52 is made so that it also acts as a light guide and that only minor losses occur on the path to the photodiode 54 mounted on the optical slide. The photodiode 54 is attached to the optical slide 52 by a transparent adhesive.

The pulses received by photodiode 54 are amplified by a fast operational amplifier preamplifier 86 having a rise time of 600 volts/microsecond and are then applied to a one-shot 98 after shaping by a Schmitt trigger 100. In the one-shot 98, the pulses are converted back to the V24 standard for transmission to a receiving personal computer 102 via a driver 104.

Figure 8:
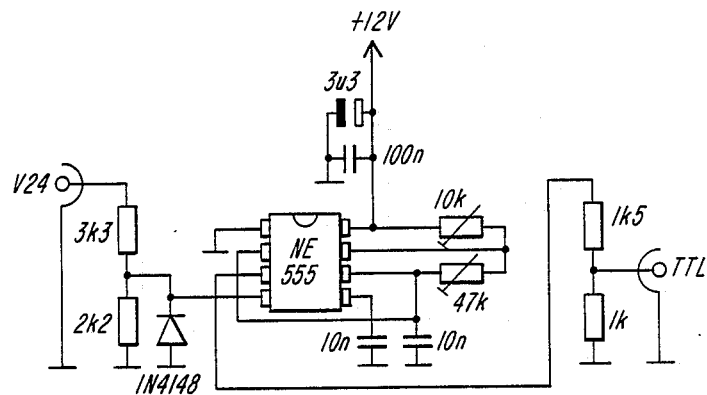
FIG. 8 is a schematic diagram of the V-24 receiver used in the transmitter of the embodiment of FIGS. 6 and 7.
Figure 9:
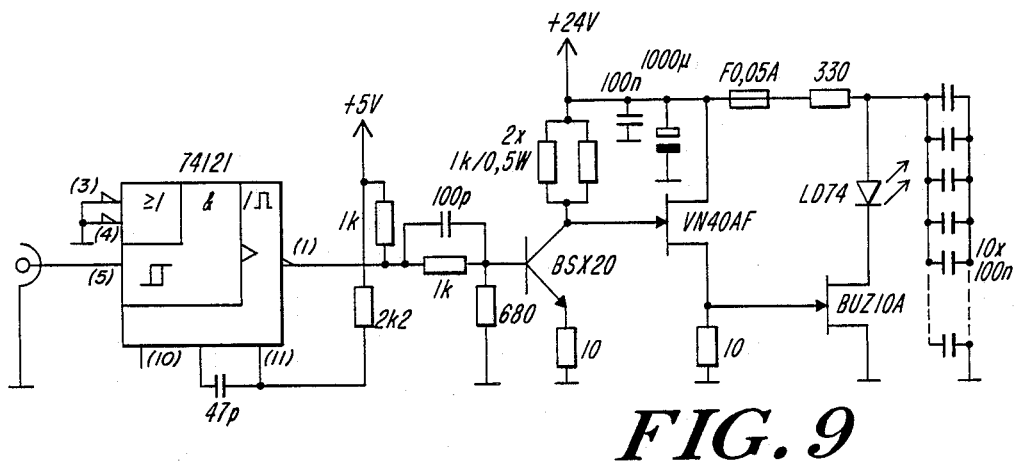
FIG. 9 is a schematic diagram of a one-shot monoflop circuit, a driver and a laser diode used in the transmitter of the embodiment of FIGS. 6 and 7.
Figure 10:
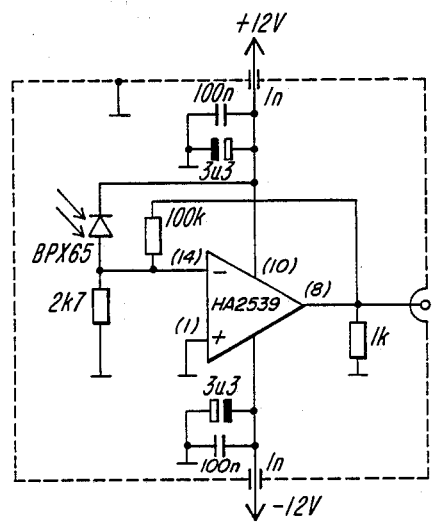
FIG. 10 is a schematic diagram of a photodiode and preamplifier used in the receiver of the embodiment of FIGS. 6 and 7.
Figure 11:
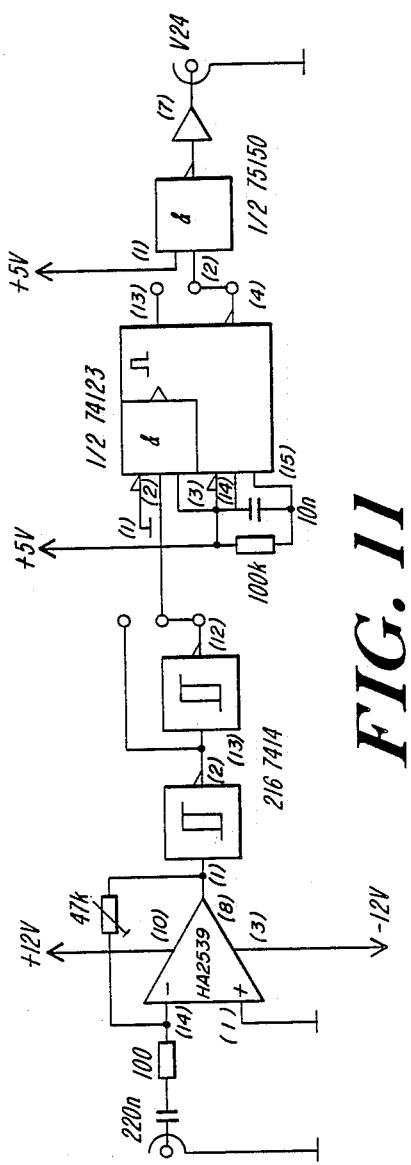
FIG. 11 is a schematic diagram of a Schmitt trigger, monoflop and driver used in the receiver of the embodiment of FIGS. 6 and 7.

FIGS. 8 through 11 are detailed diagrams of the transmitter and receiver circuits. FIG. 8 shows the V24 converter 92; FIG. shows the one-shot circuit 94, the driver 96 and the laser diode 82; FIG. 10 shows the photodiode 54 and the preamplifier 86; and FIG. 11 shows the Schmitt trigger 100, one-shot 98 and driver 104.

In the experimental embodiment, the optical slide 52 is placed on the core of the glass fiber 50 without a contact fluid. Transmission losses, however, are considerably reduced by using a contact fluid with a high cohesion between the optical slide 52 and the core of the glass fiber 50, therein bridging the air gap between the optical slide and the core which is otherwise impossible to eliminate. Tests have shown, however, that for short distances up to a few meters, losses during operation without a contact fluid can be compensated by using pulsed laser diodes with high dynamics.

The experimental embodiment is only one of many possible versions. Thus, for example, for short transmission distances the transmitting laser diode 82 can be replaced by a simple LED. If high data rates (greater than 20 KBd) are to be transmitted, a continuous wave laser diode may be used.

To minimize the losses in the glass fibers, it is advantageous for them to be partially jacketed and designed as step-index or gradient fibers. On the jacketed side of the fiber, the fiber can be glued to an appropriate guide track 60 without major expense.

Figure 12:
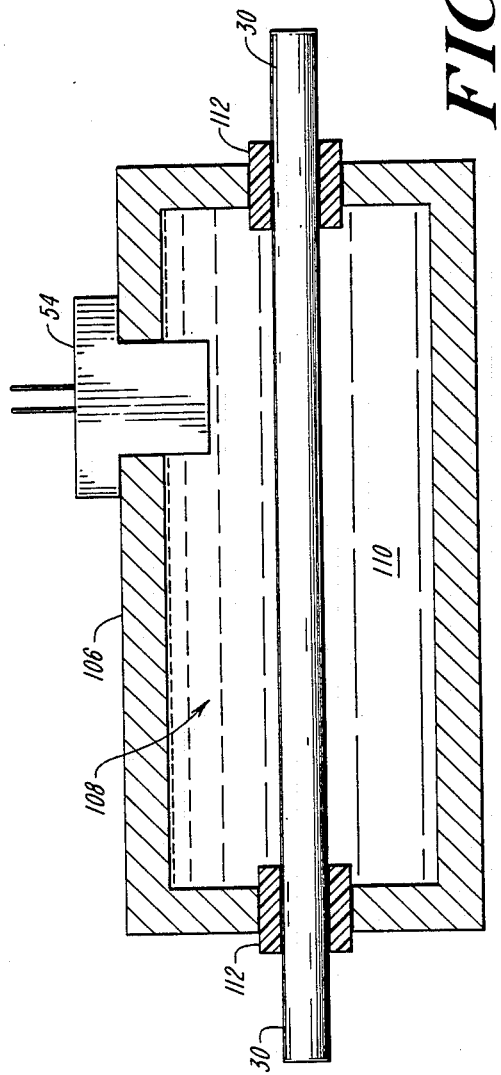
FIG. 12 is a partially cross-sectional view of an alternative embodiment of the present invention.

To keep the losses along the transmission path as small as possible, an alternative embodiment of the coupling device is possible. As shown in FIG. 12, the core 30 of a glass fiber is removed from its jacket and the fiber core 30 is slid into a housing 106 defining a chamber 108 filled with a liquid 110 having an index of refraction greater than the index of refraction of the medium surrounding the remainder of the glass fiber core 30. A pair of gaskets 112 disposed in the housing 106 around the core 30 prevent the liquid 110 from leaking out of the chamber 108 around the core while permitting sliding motions of core 30. A photodiode 54 is disposed on the housing 106 within the chamber 108. Because of the index of refraction of the liquid 110 compared to the index of refraction of the glass fiber core 30 permits light to escape the core 30, a pulsed light beam transmitted by the glass fiber core will be coupled out of the core over the entire length of the chamber 108. The photodiode 54 serves as a receiver for the light pulse beams coupled out of the glass fiber core 30.

Figure 13:
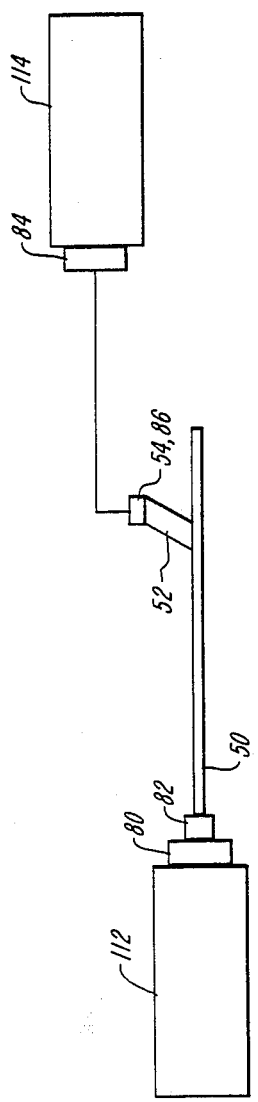
FIG. 13 is a general view of an application of the present invention.

In FIG. 13, there is shown a diagrammatic representation of the invention in application to the transmission of data between a relatively moving system 112 and a stationary system 114 via electronics 80, emitter 86, fiber 50, slide 52, photodiode 54, preamplifier 86 and electronics 84.

A variety of modifications and variations of the present invention are possible in light of the above teachings. It is therefore to be understood that within the scope of the appended claims, the present invention may be practiced otherwise than as specifically described hereinabove.

We claim:

1. A device for coupling light into and out of a light guide transmitting light in a propagation direction and surrounded by a light transmitting medium, comprising:
a coupling element contacting the core of the light guide and movable along the light propagation direction, wherein the coupling element has an index of refraction greater than the index of refraction of the light transmitting medium surrounding the light guide.

2. The device of claim 1, wherein the index of refraction of the coupling element is greater than the index of refraction of the core of the light guide.

3. The device of claim 1, wherein the light guide is a step-index fiber completely or partially freed of its protective jacket and cladding.

4. The device of claim 1, wherein the light guide is a gradient fiber completely or partially freed of its jacket.

5. The device of claim 1, wherein the coupling element is also a light guide.

6. The device of claim 1, wherein the coupling element includes an optical slide.

7. The device of claim 1, further including a contact fluid with a high cohesion disposed between said coupling element and said light guide.

8. A device for coupling light into and/or out of a coupling area of a light guide surrounded by a light transmitting medium, comprising:
a housing surrounding the coupling area of the light guide and defining a chamber, said light guide including a glass fiber completely freed of its jacket in at least said coupling area;
a liquid disposed within the chamber and surrounding the light guide within the chamber, wherein the liquid has an index of refraction greater than the index of refraction of the light transmitting medium surrounding the light guide; and a photodiode disposed on said housing within said chamber for receiving light coupled out of the light guide.

9. A data communication system comprising:

a data source;

a data receiver;

said data source being movable relative to said data receiver;

an optical guide including an exposed core section;

means for coupling data from said source to said guide;

means for coupling data from the exposed core section of said guide to said receiver; and means for providing relative motion between one of said coupling means and said guide while data is coupled thereby.

10. The system of claim 9, wherein said one coupling means includes an optically transmitting slide in optical contact with said guide.

11. The system of claim 10, wherein said slide has an index of refraction sufficiently high to couple light to said slide from said guide where in the absence of said slide light remains in said guide.

12. The system of claim 9, wherein one of said coupling means includes a fluid in optical contact with said guide.

13. The system of claim 12, wherein said fluid has an index of refraction sufficiently high to couple light out of said guide where in the absence of said fluid light remains in said guide.

* * * * *